United States Patent [19]
Luo et al.

[11] Patent Number: 6,109,648
[45] Date of Patent: Aug. 29, 2000

[54] CONTROL UNIT FOR AN OCCUPANT RESTRAINT SYSTEM USING ADAPTIVE TRIGGERING THRESHOLD

[75] Inventors: Kuang-Tso Luo; Ren Her Chen; Ray Jung Chen; Life You; Chang Dong, all of Tao Yuan, Taiwan

[73] Assignee: Chung Shan Institute of Science and Technology, Tao Yuan, Taiwan

[21] Appl. No.: 09/059,524

[22] Filed: Apr. 14, 1998

[30] Foreign Application Priority Data

Jun. 26, 1997 [TW] Taiwan ................................ 86210557

[51] Int. Cl.$^7$ ................................ B60R 21/32
[52] U.S. Cl. ................................ 280/735; 701/45
[58] Field of Search ................................ 280/734, 735; 701/29, 31, 34, 45

[56] References Cited

U.S. PATENT DOCUMENTS

| | | | |
|---|---|---|---|
| 3,851,305 | 11/1974 | Baba et al. | 280/735 |
| 5,390,951 | 2/1995 | Iyoda | 280/735 |
| 5,416,360 | 5/1995 | Huber et al. | 280/735 |
| 5,709,403 | 1/1998 | Taguchi et al. | 280/735 |

*Primary Examiner*—Eric Culbreth
*Attorney, Agent, or Firm*—Rosenberg, Klein & Lee

[57] ABSTRACT

An adaptive activation control device for an occupant restraint system of a vehicle is provided that includes an electrical energy reserve circuit, an electronic accelerometer, a microprocessor unit, an electromechanical impact sensor, a firing circuit control unit, and a warning light driving circuit. The restraint system activation is determined by the two kinds of impact sensors. The first of the sensors is the electronic accelerometer, which provides analog output signals that are converted into digital signals. Then, the digital signals are processed by an algorithm in the microprocessor unit. Finally, the activation of the occupant restraint system will be determined by the adaptive triggering threshold. The second of the sensors is the electromechanical impact sensor. The impact sensor is connected in series with the firing circuit for higher safety. Both of the sensors have to operate normally in order for the adaptive control unit to work properly.

4 Claims, 4 Drawing Sheets

CONTROL UNIT FOR AN OCCUPANT RESTRAINT SYSTEM USING ADAPTIVE TRIGGERING THRESHOLD

BACKGROUND OF THE INVENTION

1. Field of the Invention

This invention is directed to an adaptive activation control unit for an occupant restraint system of a vehicle. This control unit was designed specifically for use with the two major kinds of restrain systems; namely, seat belts and air bags. In a collision, both the pre-tensioner devices of seat belts and air bags have to be activated in time so that the driver and a passenger can be well protected.

2. Prior Art

In the past, the main activation control system was composed of several impact sensors installed in different parts of an automobile: the activation is determined by the deceleration magnitude received by these sensors. Though the system may be reliable, it still has the following problems or disadvantages:

(1) These sensors are usually installed at the "crash zones" of an automobile. After a collision takes place, they usually need to be replaced, which is not cost effective.

(2) The central control device has to be connected to the sensors by a wire harness; so, the reliability of the system is decreased. In addition, these wires may be damaged by the collision that the system is designed to detect, which may cause a failure of the activation control.

(3) A certain type of sensor may be specifically designed for a certain type of automobile; different sensors may have different activation criteria. Also, those impact sensors are more expensive to be adjusted or fixed, and are not cost effective as a result.

(4) In a collision, because the driver and passenger are located in the non-crash zone of the automobile, the impact condition imposed on these people will be different from that on the sensors. Therefore, this impact magnitude different may cause an unnecessary activation of the air bag or other protection device.

(5) These systems have a weaker self-testing capability.

SUMMARY OF THE INVENTION

The main feature of the present invention is the adaptive, two-fold activation control, so that the level of safety is increased by eliminating false activations.

Other features of this invention include the lowering of maintenance cost (after a collision) and a stronger self-testing capability (i.e., its circuits are checked periodically for better safety).

Finally, this invention is an improved activation control unit. It can activate the restraint system effectively and reliably so that injuries to the driver and a passenger in a collision can be reduced to a minimum.

Installed at a proper location in an automobile, this invention works well after an automobile is started. First, this invention carries out its self-testing function. The microprocessor unit will send an "operation command" to the accelerometer (as if −50 g deceleration is imparted thereto) and monitors if the command is carried out properly by the accelerometer. Then, the reserved power circuit, firing circuit, connector condition, etc. are checked. After everything has been checked and found to be functioning properly, the warning lamp will turn off. Otherwise, it will be lit continuously. During the operation of an automobile, the self-testing function is carried out periodically, so that a problem can be detected immediately and the driver may be warned.

The continuous analog signals send out by the electronic accelerometer are converted into digital signals by an analog to digital converter. These digital signals are processed and calculated by the microprocessor. If the average slope and average jerk (average acceleration rate of change) of the signals are greater than the pre-set values, the microprocessor will send out the triggering command to the firing circuit control unit. In the meantime, the normally open electromechanical impact sensor, connected in series with the firing circuit may close. only when the impact sensor works with a lower g force, and the triggering command has been sent out simultaneously, will the passive restraint system be activated.

For the detailed description, functions and effects of this invention and how this invention works, please refer to the following Figures and the explanations on them:

DETAILED DESCRIPTION OF PREFERRED EMBODIMENT

Figure 1:
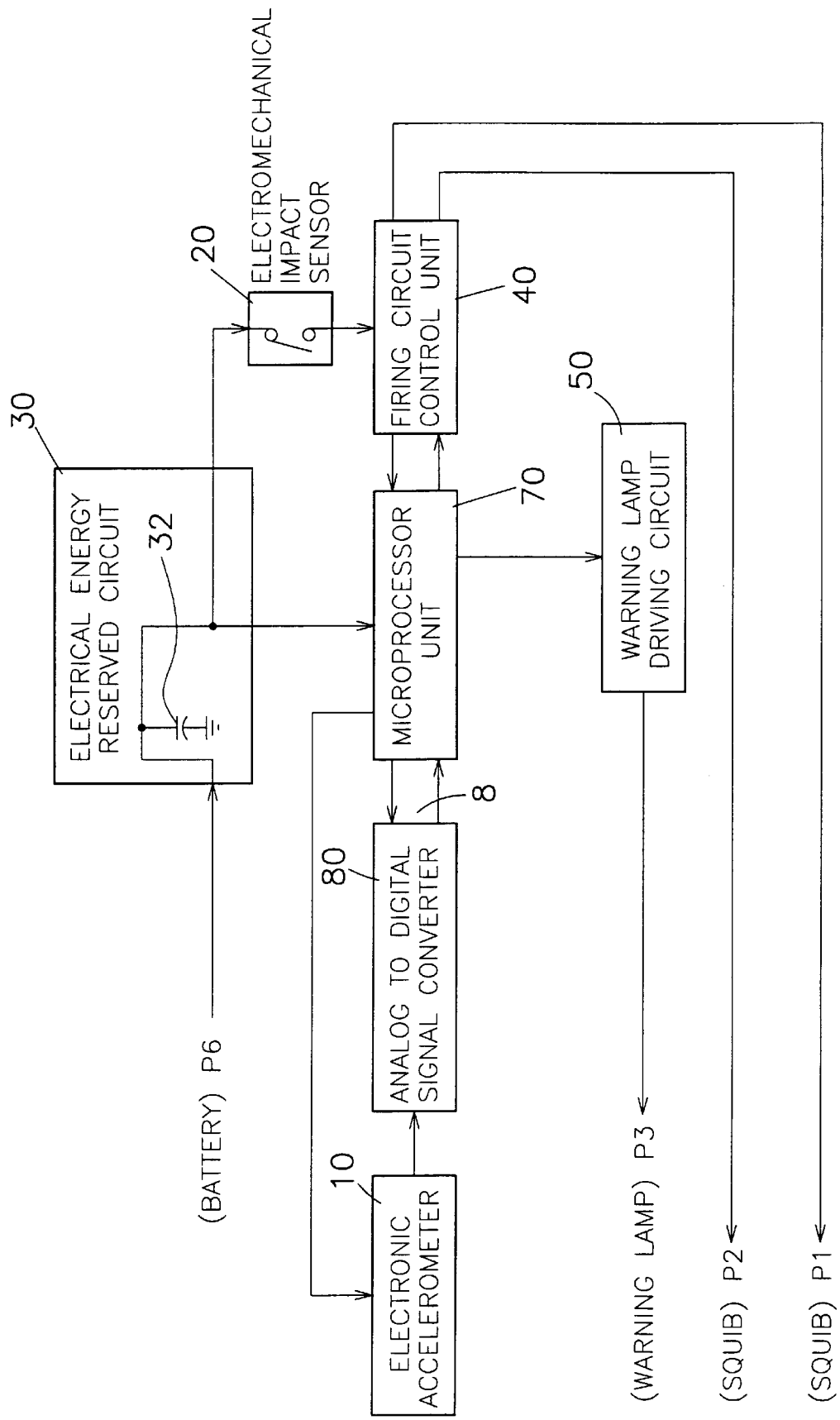
FIG. 1 is a block diagram of the present invention.

As shown by FIG. 1, this invention is composed of the following: two kinds of impact sensor, an electronic accelerometer 10 and an electromechanical impact sensor 20, analog to digital signal converter 80, microprocessor unit 70, firing circuit control unit 40, and warning lamp driving circuit 50.

The electrical energy reserve circuit 30 supplies energy to the squibs of the restraint system and to the whole control unit in case of a power disruption, when no electricity can be drawn from the battery, for at least 100 ms.

Figure 4:
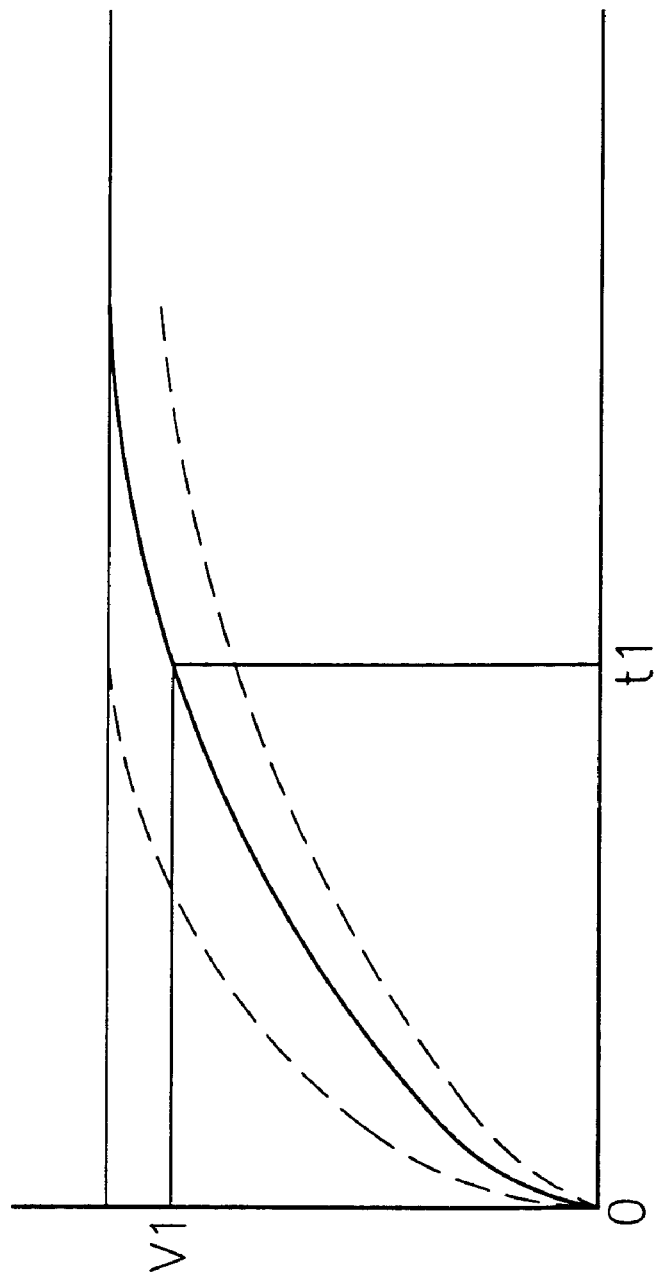
FIG. 4 is a graph showing the voltage rising status when the electrical energy reserve circuit is charged up in a certain duration.

The self-testing function of the electrical energy reserve circuit 30 is mainly targeted at examining the electrical storing capability of the charging/discharging capacitor 32. The examination works as follows: as shown in FIG. 4, the voltage of the capacitor 32 should rise up to V1, 63% of the power source voltage, in an allocated duration t1 (2 seconds). It this voltage level is reached too soon or too late, a message will be sent to the microprocessor unit 70 and some warning will be sent out by the warning lamp driving circuit 50.

The warning lamp driving circuit 50 takes commands from the microprocessor unit 70. The waning lamp driving circuit controls the turning on and off of the warning lamp in the instrument panel of an automobile. After an automobile is started, this warning lamp will remain lit until all the self-tests have been carried out. First, this invention carries out its self-testing function. The microprocessor unit will send an "operation command" to the accelerometer (as if −50 g deceleration is imparted thereto) and monitors if the command is carried out properly by he accelerometer. Then, the reserved power circuit, firing circuit, connector condition, etc. are checked. After everything has been checked and found to be functioning properly, the warning lamp will turn off. Otherwise, it will be lit continuously. If any single test fails, the light will remain lit to indicate to the driver that a problem exists. During the operation of an automobile, the self-testing function is carried out periodically, so that a problem can be detected immediately and the driver may be warned.

This control unit consists of two kinds of impact sensors. The first kind of sensor is the electronic accelerometer 10. The analog output of sensor 10 is converted into digital signals. Them, the signals are processed by an algorithm in the microprocessor unit 70, to determine if the occupant restraint system should be activated or not. The second kind of sensor is the electromechanical impact sensor 20. If the g force value (due to an impact) exceeds a preset value, it will transition from an open state to a closed state. In addition, the impact sensor 20 is connected in series with the firing circuit 40 for higher safety. Both sensors have to operate normally in order for th e control unit to work properly.

The analog to digital signal converter 80 converts the analog signals from the electronic accelerometer 10 into digital signals. The digital signals will then be fed to the microprocessor unit 70 to be processed by its collision determination algorithm.

The activation of the restraint system is controlled by the collision determination algorithm. Thus, this collision determination algorithm is very important. The microprocessor unit 70 functions as follows: the average slope of crash pulse and the average jerk (average acceleration rate of change) are calculated. If those two values reach the pre-set threshold values in the allocate d duration, the microprocessor unit will send out the command to the firing circuit control unit 40 to activate the occupant restraint system.

The pre-set average jerk values have two sets of numbers, higher and lower ones. Which set is used depends on the average slope of the crash pulse. If this slope value does not exceed the pre-set value, the higher set is used. If it does exceed the pre-set value, the lower set is chosen, thereby providing an adaptive triggering threshold control.

The "adaptive triggering threshold" results from the pre-set threshold value, higher or lower, being established in dependence on the average slope of the crash pulses, to define the activation criterion for the occupant restraint system.

Figure 2:
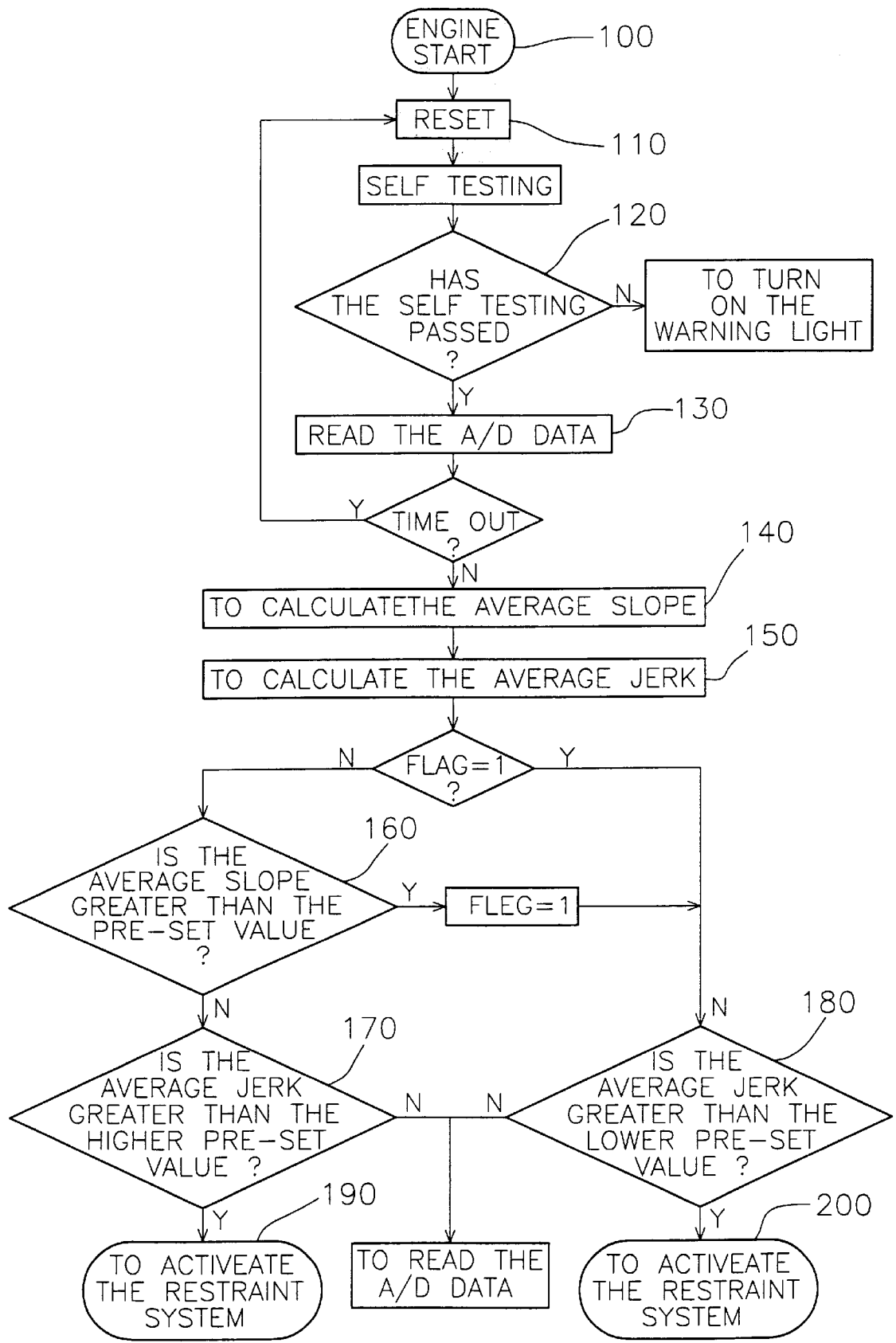
FIG. 2 is a program flowchart of the microprocessor unit of the present invention.

As shown in the algorithm flowchart of FIG. 2, after an automobile is started in block 100, all the circuits will first be checked by a self-testing function in block 110. After all the circuits have checked out all right in test block 120, any analog collision signals from the electronic accelerometer will be converted into digital signals and the digital signals enter the microprocessor unit in block 130. In the microprocessor unit, from the digitized waveforms, the average slope in block 140 and the average jerk in block 150 are calculated. If these two values reach the pre-set threshold values within the allocated duration, as determined in blocks 160, 170, 180, the microprocessor unit will send out the command to the firing circuit control unit to activate the restraint system in blocks 190, 200.

Figure 3:
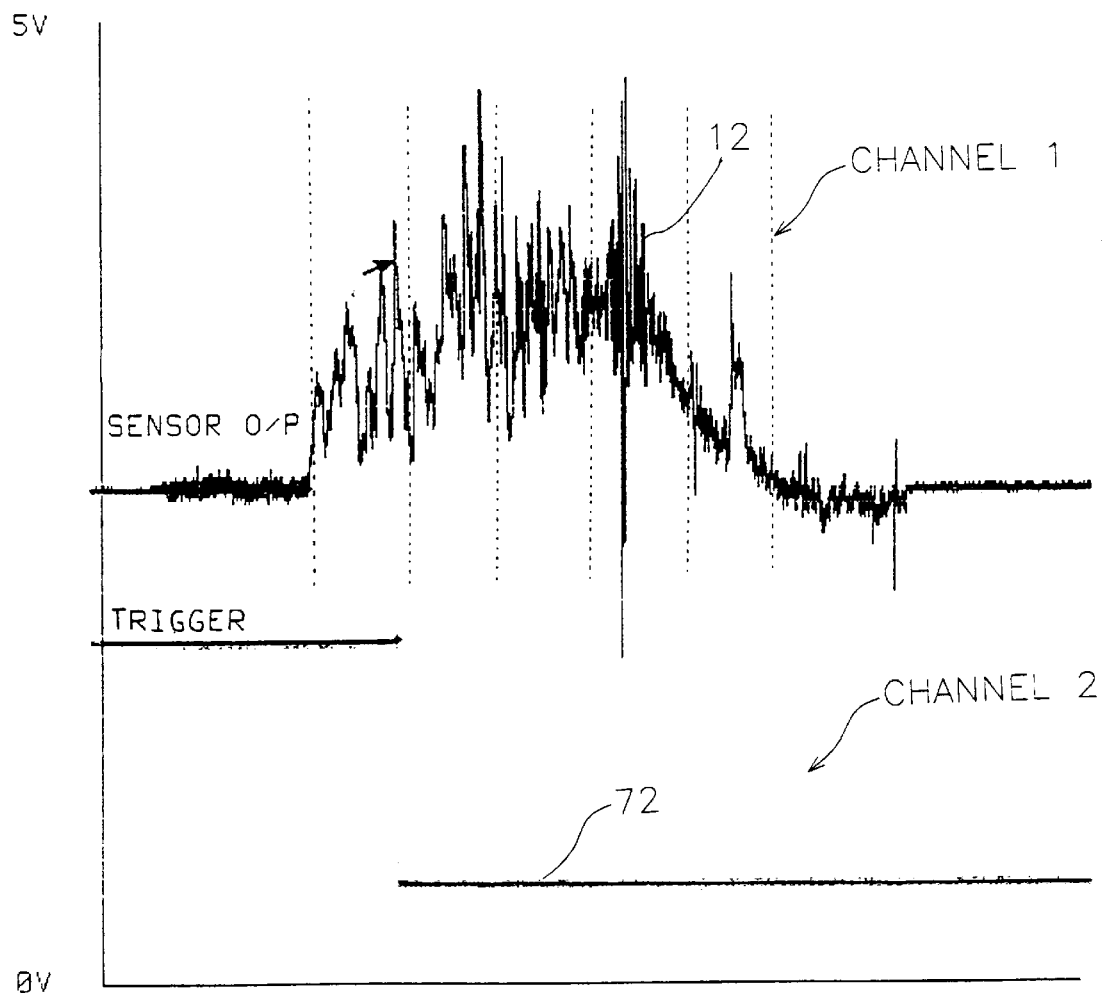
FIG. 3 is an illustration of graphs showing how quickly the activation decision is made in a 30 mph frontal collision in the present invention.

FIG. 3 is a frontal collision (crash pulse trigger time) signal for a Nissan Maxima traveling at 30 mph into a hard obstacle. The waveform 12 from the electronic accelerometer 10 is displayed on channel 1. The trigger signal 72 from the microprocessor 70 is displayed on channel 2.

From the graphs of FIG. 3, it can be determined that the whole collision duration took 90 ms, while the adaptive activation control device took 18 ms from "the collision starting time" to "send out the activation command".

In conclusion, this adaptive activation control device can enhance occupant protection, lower the repair/maintenance cost, work effectively and eliminate the disadvantages of the traditional activation control system. Although a certain preferred embodiment of the present invention has been shown and described in detail, it should be understood that various changes and modifications may be made therein without departing form the scope of the invention as defined in the appended claims.

What is claimed is:

1. An activation control device for an occupant restraint system of a vehicle, comprising:

an electronic accelerometer mounted in the vehicle for output of analog signals corresponding to acceleration and deceleration of the vehicle;

an analog to digital converter having an input coupled to said electronic accelerometer for converting said analog signals to digital signals;

a microprocessor having an input coupled to an output of said analog to digital converter for analyzing said digital signals to detect a crash pulse signal;

an electrical energy reserve circuit having an input coupled to a vehicle battery and an output coupled to said microprocessor for storing energy to power said activation control device and squibs of the occupant restraint system of the vehicle;

a firing circuit control unit coupled to said microprocessor and having an output coupled to the squibs of the occupant restraint system of the vehicle for initiating the firing of the squids responsive to a triggering signal from said microprocessor;

an electromechanical impact sensor coupled in series with said electrical energy reserve circuit and said firing circuit control unit, said impact sensor providing an electrical connection between said electrical energy reserve circuit and said firing circuit control unit responsive to a detected vehicle impact force exceeding a predetermined force value; and, a warning lamp driving circuit having an input coupled to said microprocessor and an output coupled to a warning lamp of the vehicle for operating the warning lamp responsive to command signals from said microprocessor.

2. The activation control device as recited in claim 1 wherein said microprocessor performs a startup test sequence that includes an electrical energy storage capability test of said electrical energy reserve circuit, said electrical energy storage capability test verifying that a stored voltage within said electrical energy reserve circuit reaches 63% of a voltage of the vehicle's battery within a predetermined time period.

3. The activation control device as recited in claim 1 wherein said microprocessor outputs said triggering signal responsive to (a) said impact sensor detecting a vehicle impact force exceeding said predetermined force value, and (b) an analysis of said crash pulse signal meeting predetermined criteria.

4. The activation control device as recited in claim 3 wherein said predetermined criteria is one of (a) an average slope value of said crash pulse signal exceeding a predetermined threshold value and an average acceleration rate of change value of said crash pulse signal exceeding a first pre-set value, or (b) said average slope value of said crash pulse signal being less than said predetermined threshold value and said average acceleration rate of change value exceeding a second pre-set value.

* * * * *